United States Patent [19]

Neckers

[11] Patent Number: 4,561,951
[45] Date of Patent: Dec. 31, 1985

[54] METHOD FOR POLYMERIZING A BIS(ALLYL CARBONATE)

[76] Inventor: Douglas C. Neckers, 108 Secor Woods La., Perrysburg, Ohio 43551

[21] Appl. No.: 630,705

[22] Filed: Jul. 13, 1984

Related U.S. Application Data

[63] Continuation-in-part of Ser. No. 444,750, Nov. 26, 1982, abandoned.

[51] Int. Cl.[4] ............................................. C08F 2/46
[52] U.S. Cl. ...................... 522/33; 156/273.7; 156/275.5; 156/275.7; 427/54.1; 427/399; 427/400; 428/412; 428/420; 428/476.6; 428/478.2; 522/34; 522/39
[58] Field of Search ............. 156/272.2, 273.7, 275.5, 156/275.7; 427/54.1, 399, 400; 428/412, 420, 476.6, 478.2; 204/159.22; 260/453 RZ

[56] References Cited

U.S. PATENT DOCUMENTS

| | | | |
|---|---|---|---|
| 2,367,670 | 1/1945 | Christ | 156/275.5 |
| 2,544,667 | 3/1951 | Goebel et al. | 428/420 |
| 3,359,129 | 12/1967 | Mao | 427/54.1 |
| 3,709,718 | 1/1973 | Schaumberg et al. | 428/420 |
| 3,716,390 | 2/1973 | Garbarini | 427/399 |
| 4,311,762 | 1/1982 | Spycher et al. | 428/412 |

*Primary Examiner*—John J. Gallagher
*Attorney, Agent, or Firm*—John C. Purdue

[57] ABSTRACT

A method for locking two surfaces relative to one another is disclosed. The surfaces can be gelatin, paper, glass, nylon, or other surfaces having hydroxyl or amine functionality. The method involves bringing the two surfaces together and irradiating the interface between the two with radiation at a wavelength which causes photopolymerization to occur to lock the surfaces relative to one another. The photopolymerization can be of a cross-linking monomer positioned between the two surfaces, can be of an acrylic monomer grafted to the two surfaces, or can be of a photoresist formed at the two surfaces; a photoinitiator is required in the first two cases.

1 Claim, No Drawings

METHOD FOR POLYMERIZING A BIS(ALLYL CARBONATE)

REFERENCE TO RELATED APPLICATION

This is a continuation-in-part of application Ser. No. 444,750, filed Nov. 26, 1982, now abandoned.

BACKGROUND OF THE INVENTION

1. Field of the Invention

This invention relates to photochemical reactions involving gelatin and other substrates and, more particularly, to photochemical reactions by which a surface of a gelatin or other body can be attached to a second surface of the same or another body. The two surfaces can be the same or different and can be gelatin, nylon, glass, or any other material, synthetic or natural, having a molecular structure which includes either a nitrogen functionality or hydroxyl groups.

2. Description of the Prior Art

Photoinitiated polymerization reactions have found commercial use in printing inks and in various coating compositions. Examples of such coating compositions include those used in filling the surfaces of particle board, those used in coloring or staining wood surfaces, those used to apply a final clear glass coating, those used to produce flexible coatings on vinyl floor surfaces, and those used in applying both base coats and clear vinyl coatings on metal surfaces, particularly metal surfaces of automobiles and components thereof.

Photoinitiated polymerizations as used in the foregoing applications involve a polymerizable monomer or a polymerizable composition and a photoinitiator, in addition to various additives which may be required for the particular application. The most common polymerizable monomers and compositions are acrylics, polyesters, and blends of styrene with maleic anhydride. Benzoin ethers, and related acetals, "Hammond's initiators", and various acetophenone derivatives are presently the most generally used photoinitiators. Polybrominated diphenyls have also been used, and cationic photoinitiators have found some commercial use as have benzoyl peroxide and many of its derivatives.

Examples of acrylic monomers and oligomers that have been used in photopolymerizable printing inks include pentaerythritol triacrylate, pentaerythritol tetraacrylate, dipentaerythritol hexacrylate, ditrimethylolpropane tetraacrylate, epoxy acrylates, epoxidized drying oil acrylate, bisphenol A diglycidyl ether acrylate, modified bisphenol A epoxy acrylate, aliphatic epoxy acrylates, polyacrylate carbamates, reaction products of a hydroxyl containing acrylate, a diisocyanate and a hydroxyl containing moeity (resin, alkyd, drying oil, polyester, etc.), polyester acrylates, polyether acrylates, acrylated alkyds, melamine acrylates, monoacrylates, hydroxybutyl acrylate, dicyclopentadiene acrylate, 1, 6-hexanediol monoacrylate, cyclohexylacrylate, triacrylates, trimethylol propane triacrylate and pentaerythritol triacrylate.

Benzoin ethers and related acetals which are used as photoinitiators usually have the general formulae:

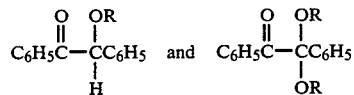

where R is an alkyl group having from one to eighteen carbon atoms.

Hammond's initiators have the general formula:

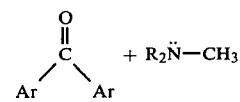

Benzophenone is a specific example of one of the Hammond's initiators that has been used. Many acetophenone derivatives have been used as photoinitiators; two specific ones have the formulae:

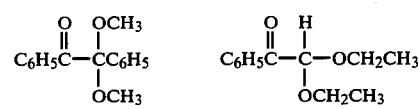

Generally, photosensitive peroxides and peresters contain an absorbing chromophore and a homolytically labile O—O bond. An example is p-benzoyl t-butyl perbenzoate:

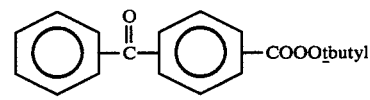

Two photopolymerizable printing ink compositions which have been disclosed in the published literature are set forth below:

|  | Weight Percent |
| --- | --- |
| Colored Pigment | 25.0 |
| Polyol Acrylate | 25.0 |
| Epoxy Acrylate | 40.0 |
| Mixed Photoinitiators | 6.5 |
| Inhibitor | 0.1 |
| Trimethylolpropane Triacrylate | 3.4 |
| Colored Pigment | 20.0 |
| Polyol Acrylate | 15.0 |
| Epoxidized Soybean Oil Acrylate | 30.0 |
| Epoxy Acrylate | 20.0 |
| Mixed Photoinitiators | 12.0 |
| Inhibitor | 0.1 |
| Trimethylolpropane Triacrylate | 2.9 |

In general, photopolymerizable printing inks, coatings, and the like are applied to substrates and exposed to light of a suitable wavelength to initiate cure, which then proceeds at an extremely rapid rate.

Cationic photoinitiators, for example the diaryliodonium and triarylsulfonium salts which are subsequently identified herein, and acrylic and other monomers such as ethers and epoxides produce polymers when the cationic photoinitiators are photolyzed in the presence of anions such as $PF_6^{31}$, $AsF_6^-$, and $SbF_6^-$ and an appropriate monomer. The anions generate the corresponding Lewis acids, $PF_5$, $AsF_5$, and $SbF_5$, or $H+$, which induce polymerization. Similarly, diaryliodonium salts, when subjected to photolysis, produce cation radicals which, in the presence of a solvent, produce aryl iodides, aryl radicals, and protonic acid, the last being a cationic catalyst for polymerization. Examples of typical operable diaryliodonium salts have the following formulae:

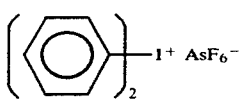

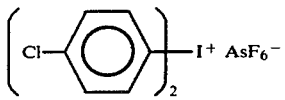

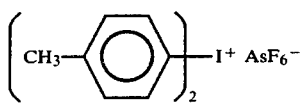

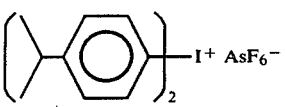

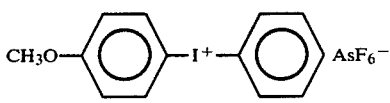

Triarylsulfonium salts, when photolyzed, undergo reactions directly analogous to those of diaryliodonium salts, also producing protonic acid. Examples of typical operable triarylsulfonium salts have the following formulae:

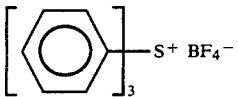

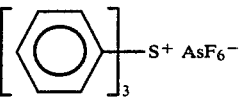

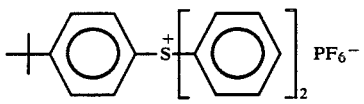

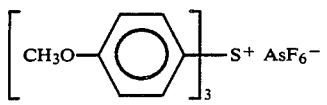

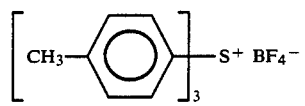

-continued

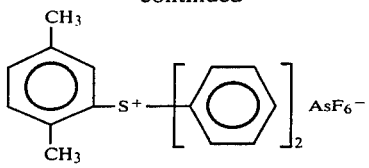

Cationic polymerization catalysts are effective with various vinyl monomers, including the acrylics discussed above and styrene, with cyclic ethers, cyclic formals and acetals, with sulphur containing monomers, with organosilicon monomers and with various materials having an epoxy function, including monofunctional epoxys, difunctional epoxys, and epoxy prepolymers and higher oligomers.

Thin polymer films, called photoresists, formed photochemically upon solid surfaces are also known. One of the first organic photoresists was a poly (vinyl cinnamate) system, produced by reacting cinnamoyl chloride and poly (vinyl alcohol) to produce photoreactive cinnamate esters. The cinnamate esters can be applied to a substrate and exposed to 300 nanometer light in a desired pattern; the exposure insolubilizes the exposed portions of the film to form a resist in the pattern in which the film was exposed to light. The unexposed portions of the film can then be washed away to expose the substrate for chemical treatment. Photoresists on silicon chips carrying a silicon dioxide coating are widely used in producing silicon integrated circuits.

3. The Instant Invention

The present invention is based upon the discoveries: (1) that the two mating parts which form a gelatin capsule can be bonded to one another by applying to their mating surfaces a thin coating of a solution of p-benzoyl tert-butyl perbenzoate in methyl methacrylate, assembling the two parts into a capsule, and irradiating the methyl methacrylate solution through the outer gelatin layer with the output of a medium/high pressure mercury resonance lamp; (2) that a gelatin capsule can be bonded to a nylon, glass or paper substrate by coating the substrate with a blend of p-benzoyl t-butyl perbenzoate and a commercially available printing ink (hereinafter identified as "Printing Ink A"), placing the capsule on the coating on the substrate and irradiating the coating through the capsule with the output of a medium/high pressure mercury resonance lamp; and (3) that two flat sheets of glass can be bonded to one another by confining, between two of the major surfaces thereof, a solution of p-benzoyl tert-butyl perbenzoate in methyl methacrylate and diethylene glycol bis (allylcarbonate) and irradiating the methyl methacrylate/diethylene glycol bis (allyl carbonate) solution with the output of a UV sun lamp. In view of these discoveries, it was appreciated that a method for locking two surfaces to one another had been invented, where both surfaces were of a material which has hydroxyl or amino groups in its structure, and that the method involved three embodiments comprising:

in a first instance, the steps of bringing the two surfaces together with a cross-linking monomer such as methyl methacrylate and a photoinitiator therebetween and irradiating the interface between the two surfaces with radiation at a wave length to which the photoinitiator is sensitive, but to which at least one of the materials is substantially transparent, and controlling the time of irradiation and the intensity of the radiation so that the two surfaces are locked relative to one another;

in a second embodiment, using a surface to which a monomer which is capable of photochemically initiated addition or condensation polymerization, e.g., an ethylenically unsaturated monomer, has been grafted and the steps of bringing the two surfaces together with a photoinitiator therebetween and irradiating the interface between the two surfaces with radiation at a wavelength to which the photoinitiator is sensitive, but to which at least one of the materials is substantially transparent, and controlling the time of irradiation and the intensity of the radiation so that the two surfaces are locked relative to one another; and in a third instance, the steps of reacting the material at the first surface to produce a photoresist, reacting the material at the second surface to produce a photoresist, bringing the first and second photoresist surfaces together and irradiating the interface between the two surfaces with radiation at a wavelength to which both of the photoresists are sensitive, but to which at least one of the materials is substantially transparent, and controlling the time of irradiation and the intensity of the radiation so that the two surfaces are locked relative to one another.

DESCRIPTION OF THE PREFERRED EMBODIMENTS

The instant invention will be more fully understood from the following examples, which describe preferred embodiments thereof; Examples 1 and 16 are the best modes that have presently been reduced to practice by the inventor. In the examples, which are presented only to illustrate and disclose the invention, and are not to be construed in any way as a limitation thereon, as elsewhere herein, the terms "percent" and "parts" refer to percent and parts by weight, unless otherwise indicated.

EXAMPLE 1

A solution was prepared from 0.5 ml methyl methacrylate and 0.2 mg p-benzoyl tert-butyl perbenzoate. A portion of the solution was brushed onto the mating surfaces of two segments of a gelatin capsule and the two segments were pushed together so that a cylindrical surface of each abutted an adjacent cylindrical surface of the other and there was methyl methacrylate plus photoinitiator solution between the abutting surfaces. The capsules used were purchesed from Eli Lilly; some were designated 0002-2409-02#2, while others were designated 0002-2413-02#00. A beam from a medium to high pressure mercury resonance lamp was then directed onto the methyl methacrylate solution in the capsule. The light was filtered so that the irradiating light had a wave length of 366 nanometers and an intensity of at least 1 to $5 \times 10^{16}$ quanta/second, as measured by ferrioxalate actinimitry. The capsule was positioned about one inch from the light. Different capsules, some empty, and some filled, were irradiated for different times, ranging from about five seconds to fifteen minutes. In all instances, the two capsule segments were found to have been locked relative to one another to such an extent that they could not be separated manually.

EXAMPLES 2–4

The procedure described in Example 1 has been repeated using other photoinitiators dissolved in 0.5 ml methyl methacrylate. In all cases the capsule parts were firmly adhered together. The photoinitiator used, the amount, and the time of exposure are set forth in the following Table:

|  | Photoinitiator Identity | mg | Exposure Time |
| --- | --- | --- | --- |
| EXAMPLE 2 | 4-vinyl-benzophenone t butyl perbenzoate | 2.0 | 30 min. |
| EXAMPLE 3 | p,p'-di-t-butyl benzoyl perbenzoate | 0.2 | 10 sec. up to 3 hr. |
| EXAMPLE 4 | 2,3-dibromo-benzo(b)thiophene | 0.2 | 5 min. |

EXAMPLE 5

The procedure described in Example 1 was repeated using, instead of the methyl methacrylate solution, a printing ink which is commercially available under the trade designation Sun Cure #1622 and from 0.5 percent to 30 percent of p-benzoyl t-butyl perbenzoate and exposure times ranging from 60 seconds to 900 seconds. The capsule parts were firmly adhered together. The higher percentages of the p-benzoyl t-butyl perbenzoate photoinitiator worked better in these applications. The printing ink which is available under th designations Sun Cure #1622 is hereinafter called "Printing Ink A".

EXAMPLES 6–8

Photopolymerization has also been used to lock gelatin relative to other substrates. In all cases, the other substrate was coated with a blend of the Printing Ink A and 0.5 to 30 percent of p-benzoyl t-butyl perbenzoate, a gelatin capsule was placed on the coating, and the capsule and the coating were irradiatd, using the light source described in Example 1. The source was, in all instances, placed about one inch from the coating/capsule interface but it could be moved either closer or farther away with similar results. The identities of the substrates and the exposure times which were found operable to cause tight adherence of the capsules to the substrates are set forth in the following Table:

|  | Substrate | Exposure time, seconds |
| --- | --- | --- |
| Example 6 | nylon block | 600–3000 |
| Example 7 | glass sheet | 600–3000 |
| Example 8 | paper sheet | 600–3000 |

EXAMPLES 9–15

Other compositions which have been used by the method described in Example 1 to adhere gelatin capsule segments to one another are identified in the following Table. In all cases, a curing time of 15 minutes was found to be operable.

| Example | Monomer Identity | Ml | p-benzoyl t-butyl perbenzoate, g. |
| --- | --- | --- | --- |
| 9 | Methyl methacrylate | 1 | 0.007 |
| 10 | Methyl methacrylate | 1 | 0.014 |
| 11 | Methyl methacrylate | 1 | 0.025 |

-continued

| Example | Monomer Identity | Ml | p-benzoyl t-butyl perbenzoate, g. |
|---|---|---|---|
| 12 | Printing Ink A | 1 | 0.0073 |
| 13 | " | 1 | 0.025 |
| 14 | " | 1 | 0.014 |
| 15 | " | 1 | 0.10 |

EXAMPLE 16

Polyethylene spacers about ¼ mm thick were placed along the four edges of one of the major surfaces of a flat sheet of glass approximately 30.5 cm by 30.5 cm by 2 mm in thickness. A second sheet of glass having substantially the same dimensions was then placed on the polyethylene spacers, with its major surfaces aligned with those of the first sheet. The edges of the two glass sheets were taped with polytetrafluoroethylene tape, and a solution prepared from 200 g methyl methacrylate, 200 g diethylene glycol bis (allyl carbonate), and 6 g p-benzoyl tert-butyl perbenzoate was injected through a hypodermic needle to fill the space between the glass sheets. The resulting sandwich was then irradiated for three hours with a uv sunlamp beam at a right angle to the major glass surfaces. The tape was then removed from the edges thereof, and the glass sheets were found to have been locked relative to one another to such an extent that they could not be separated manually.

The procedure described in Example 16 has also been used to produce laminates with other monomer/photoinitiator solutions. Exemplary solutions are identified below:

| | p-Benzoyl-t-butyl perbenzoate | Diethylene glycol bis (allyl carbonate) | Methyl methacrylate | Clear printing ink prepolymer |
|---|---|---|---|---|
| Example 17 | 6 g | 300 g | 100 g | — |
| Example 18 | 6 g | 100 g | 300 g | — |
| Example 19 | 6 g | 100 g | — | 300 g |
| Example 20 | 6 g | 200 g | — | 200 g |
| Example 21 | 6 g | 300 g | — | 100 g |

Laminates have also been produced from the solutions of Examples 16-21, except that 6 g portions of p,p'-di-tert-butyl carboperoxy benzophenone were substituted for the p-benzoyl tert-butyl perbenzoate used in the procedures which constituted the basis for those Examples.

The printing ink prepolymer used in the procedures descriped as Examples 19, 20 and 21 is one which can be obtained from Sun Chemical under the indicated designation. The diethylene glycol bis(allyl carbonate) used in the procedures described as Examples 16 through 21, inclusive, is commercially available from PPG Industries under the designation "CR-39 Monomer"; it has the chemical formula

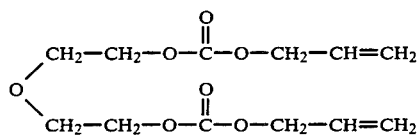

Other monomers similar to diethylene glycol bis(allyl carbonate) are known, being disclosed, for example, in U.S. Pat. Nos. 2,370,565 through 2,370,575, all granted on Feb. 27, 1945, and in U.S. Pat. No. 4,293,503, granted on Oct. 6, 1981. These other monomers can also be photopolymerized, alone or dissolved in another compatible monomer or in other compatible monomers, using p-benzoyl tert-butyl perbenzoate, p,p'-di-tert-butyl carboperoxy benzophenone, or another photoinitiator disclosed in U.S. Pat. No. 4,416,826, granted Nov. 22, 1983. Such photoinitiators have the formula

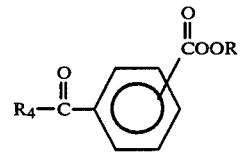

where R is a $C_1-C_{22}$ alkyl group; and $R_4$ is an organic group such that the moiety

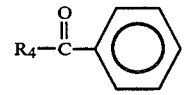

is a light absorbing chromophore group which produces an excited state by light absorption and is selected from the group consisting of $C_1-C_{22}$ alkyl groups, $C_3-C_{22}$ cycloalkyl groups, $C_6-C_{22}$ aryl groups, $C_7-C_{22}$ aralkyl groups, $C_7-C_{22}$ alkaryl groups, $C_1-C_{22}$ alkoxy substituted aryl groups and morpholinyl, piperidyl, thiophenyl and furanyl heterocyclic groups. In general, diethylene glycol bis(allyl carbonate) and other similar monomers are preferred monomers for use in practicing the instant invention; other similar monomers have the formula:

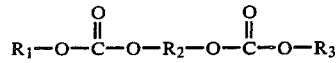

where $R_1$ and $R_3$ are allyl groups and $R_2$ is an alkylene chain, preferably one having from 2 to 8 carbon atoms, a di-, tri- . . . or polyether, a mixed alkylene-ether/polyether chain or an aralkyl group having 2 aliphatic side chains. $R_1$ and $R_3$ are represented by the formula

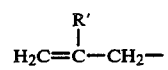

where R' may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly $R_1$ and $R_3$ are allyl groups, $H_2C=CH-CH_2-$. Still other monomers that can be subjected to addition polymerization are disclosed in U.S. Pat. No. 2,443,741, granted June 22, 1948; the ones of those monomers which are free of aromatic groups can be photopolymerized, either alone or in combination with a compatible monomer or with compatible monomers, using one of the photoinitiators disclosed in U.S. Pat. No. 4,416,826. Such photopolymerizable monomers and monomer compositions can be used in practicing the instant invention.

In Examples 1–15, above, the amount of monomer-photoinitiator composition applied was not controlled, but was essentially the minimum that could be applied by the technique employed. Usually, the amount should be at least 1 milligram per square centimeter and can be as much as 100 milligrams per square centimeter. There is ordinarily no reason to use more than 70 milligrams per square centimeter of the monomer/photoinitiator mixture; excellent results have been achieved when the amount ranged from 10 to 60 milligrams per square centimeter.

When a cross-linking monomer or monomer composition and a photoinitiator or photoinitiators are used in practicing the instant invention, the photoinitiator(s) usually should constitute from about 0.1 percent to about 30 percent of the monomer or monomer composition. When a gelatin or other surface to which a photoresist has been applied or an acrylic monomer has been grafted is used, the photoresist or acrylic monomer should constitute from about 0.2 to about 0.7 milligram per square centimeter of the gelatin or other surface, and the amount of photoinitiator used should constitute from about 0.1 percent to about 30 percent of the photoresist or grafted monomer.

It will be appreciated from the foregoing specific Examples that the indentities of the polymerizable material and of the photoinitiator used in practicing the instant invention are not critical. Any combination of a polymerizable monomer and a photoinitiator therefor can be used, for example, any of the previously known materials comprising polymerizable monomers and a photoinitiator therefor. Furthermore, the polymerizable monomer can be a product of the reaction of a non-toxic material with a reactant having at least one unsaturated moiety. Sugars, e.g., lactose, mannose, glucose and sucrose, and amino acids, e.g., glycine, leucine and hydroxyproline, are examples of non-toxic materials which can be reacted, for example, with acrylic acid, methacrylic acid, maleic acid or anhydride, diethylene glycol bis (allyl carbonate) or fumaric acid, to produce polymerizable monomers of the indicated type.

The photoinitiator can be a benzoin ether, one of the Hammond's initiators, or one of the acetophenone derivatives which, when irradiated with light of a suitable wavelength, reacts to produce radicals which initiate polymerization. It can also be one of the variety of peroxides and peresters known by those skilled in the art to serve these purposes. The initiator can also be one which, when so irradiated, produces a Lewis acid which initiates polymerization. Further, the gelatin or other surface can be one to which an acrylic polymer has been grafted, for example, by a known chemical, catalytic reaction, which probably grafts the acrylic monomer to the gelatin or other surface through a carbon to carbon bond, provided that there is a suitable, known photoinitiator present between the grafted surface and the second surface, or, the two surfaces to be locked relative to one another can both be converted to photoresists so that, when the surfaces are brought together and irradiated with light of a suitable wavelength, they are locked to one another.

The irradiating light must be of a suitable wavelength to cause photoinitiation, but the specific wavelength or range of wavelengths required is determined by the identity of the photoinitiator, as known in the art. The rate of initiation is an inverse function of the distance from the light source and a direct function of the intensity of the radiation.

The instant invention is useful in various photographic applications to adhere a gelatin surface to another surface, for example of gelatin, glass, nylon or the like. As a specific example, the gelatin surface of a photographic transparency, either a negative or a positive, can be adhered to a protective glass cover to prevent damage from incidental dirt or handling. Furthermore, the invention can be used to produce tamper-proof capsules for medicinal purposes, by adhering together two capsule segments containing a medication where the resulting capsule is non-toxic or by adhering together two capsule segments containing a previouly encapsulated medication in other cases, or where non-toxicity has not been established. Where two capsule segments adhered together enclose a previously encapsulated medication, the ultimate user is assured that the encapsulated medication inside the sealed outer capsule has not been adulterated; the user merely removes the sealed outer capsule and ingests the protected inner capsule and its medication.

The invention is also useful in the production of safety glass, as a laminate comprising two sheets of glass bonded together by a transparent resin can be produced by the simple method described in Example 16. Unlike previously known methods for producing safety glass, it is not necessary that the adjacent surfaces of the glass sheets match one another closely in shape or that a polymerized intermediate layer precisely fill the space between the glass sheets; indeed, neither heat nor appreciable pressure is generally required to produce a laminate by the method of the instant invention. It is contemplated that a resilient gasket around the perimeter between two flat or curved sheets of glass can be used to confine a solution of a photoinitiator in methyl methacrylate, diethylene glycol bis (allyl carbonate) or other monomer during photoinitiated polymerization to produce a safety glass laminate.

It will be apparent that various changes and modifications can be made from the specific details disclosed herein without departing from the spirit and scope of the invention as defined in the appended claims.

What is claimed is:

1. A method for polymerizing a bis(allyl carbonate) having the formula

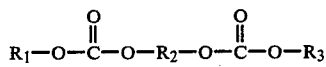

where $R_1$ and $R_3$ are allyl groups and $R_2$ is an alkylene chain, a di, tri- . . . or polyether, a mixed alkylene-ether/polyether chain or an aralkyl group having 2 aliphatic side chains, and $R_1$ and $R_3$ are represented by the formula

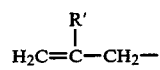

where R′ is hydrogen, halogen, or a 1 to 4 carbon alkyl group, said method comprising mixing the bis(allyl carbonate) and from 0.1 percent by weight to 30 percent by weight of a photoinitiator having the formula

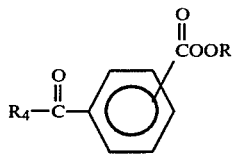

where R is a $C_1$–$C_{22}$ alkyl group; and $R_4$ is an organic group such that the moiety

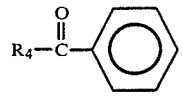

is a light absorbing chromophore group which produces an excited state by light absorption and is selected from the group consisting of $C_1$–$C_{22}$ alkyl groups, $C_3$–$C_{22}$ cycloalkyl groups, $C_6$–$C_{22}$ aryl groups, $C_7$–$C_{22}$ aralkyl groups, $C_7$–$C_{22}$ alkaryl groups, $C_1$–$C_{22}$ alkoxy substituted aryl groups and morpholinyl, piperidyl, thiophenyl and furanyl heterocyclic groups, irradiating the bis(allyl carbonate) photoinitiator mixture with radiation at a wave length to which the photoinitiator is sensitive, and controlling the time of irradiation and the intensity of the radiation so that the bis(allyl carbonate) is polymerized.

* * * * *